US012530660B1

(12) United States Patent
Kim et al.

(10) Patent No.: US 12,530,660 B1
(45) Date of Patent: Jan. 20, 2026

(54) METHODS AND SYSTEMS FOR CROWD SOURCING TRUSTED EMPLOYMENT REFERRALS

(71) Applicant: THE TRUST LLC, Dover, DE (US)

(72) Inventors: Jin Kim, Gaithersburg, MD (US); Conway Lin, Perry Hall, MD (US); Taft Wallace, Broadlands, VA (US); Christopher Reinhardt, Arlington, VA (US); Jonatan Membreno, Sterling, VA (US)

(73) Assignee: THE TRUST LLC, Dover, DE (US)

( * ) Notice: Subject to any disclaimer, the term of this patent is extended or adjusted under 35 U.S.C. 154(b) by 0 days.

(21) Appl. No.: 18/779,606

(22) Filed: Jul. 22, 2024

(51) Int. Cl.
*G06Q 10/1053* (2023.01)
(52) U.S. Cl.
CPC ................. *G06Q 10/1053* (2013.01)
(58) Field of Classification Search
CPC .................................................. G06Q 10/1053
See application file for complete search history.

(56) References Cited

U.S. PATENT DOCUMENTS

| 2021/0342836 | A1* | 11/2021 | Cella | G06N 7/01 |
| 2022/0391850 | A1* | 12/2022 | Morris | H04L 9/50 |
| 2024/0144118 | A1* | 5/2024 | Gundlapalli | G06Q 10/063112 |
| 2024/0346522 | A1* | 10/2024 | Stone | G06Q 10/1053 |

FOREIGN PATENT DOCUMENTS

WO    WO-2017153495 A1 *  9/2017  ......... G06Q 10/1053

OTHER PUBLICATIONS

Allen et al. "On costly signalling in DAOs: A research agenda" RMT Blockchain Innovation Hub; RMIT University; Jun. 26, 2024; arXiv:2406.18457 (Year: 2024).*

* cited by examiner

*Primary Examiner* — Wenren Chen
(74) *Attorney, Agent, or Firm* — David J. Cho; McNees Wallace & Nurick

(57) ABSTRACT

Systems and methods for creating a referral-based database of resumes of candidates using blockchain smart contracts are provided. The systems and method include providing at least one smart contract blockchain profile, the at least one smart contract blockchain profile corresponding to a unique user profile containing qualifications and experiences of at least one candidate, storing the at least one smart contract blockchain profile in a shared ledger of a database, accessing, via user interface, the at least one smart contract blockchain profile via the shared ledger of the database, implementing a scoring match value of the at least one smart contract blockchain profile against a posted qualifications and experiences requirement, implementing a pricing value to gain access to the least one smart contract blockchain profile, and allowing access of the at least one smart contract blockchain profile based on an accepted pricing value.

15 Claims, 11 Drawing Sheets

METHODS AND SYSTEMS FOR CROWD SOURCING TRUSTED EMPLOYMENT REFERRALS

TECHNICAL FIELD

The present disclosure relates generally to systems and methods for implementing job searching services. More specifically, the present disclosure relates to systems and methods for crowd sourcing trusted employment referrals built on a distributed ledger technology of blockchain cryptography.

BACKGROUND

Large employment recruiting platforms such as LINKED-IN.COM, INDEED.COM, MONSTER.COM, etc. have created virtual marketplaces that use social networking to facilitate and coordinate interactions primarily between employers and candidates. However, these platforms do not have any capabilities or solutions intended specifically to increase the number of referrals, or that focus on increasing the participation of referrers. Moreover, pre-existing recruiting platforms do not provide solutions that capitalize on the importance of pre-existing relationships (i.e., referrals) between employers and referrers in hiring. That is, there are no solutions that financially incentivize (i.e., "crowd-sourced") referrals. It is well-known that referrals result in the best hiring outcomes; however they are among the fewest/rarest recruitment leads. For instance, 45% of referral hires stay longer, i.e., longer than 4 years, compared to only 25% of job board hires. Additionally, on average, human resource professionals save 13 days to hire referrals—an over 50% time savings compared to hires from other sources averaging 24 days.

Furthermore, there are currently no solutions in existing platforms to digitize personal and professional relationships for the purposes of automating employment referrals. For instance, the use of distributed ledger technology (DLT) of blockchain cryptography allows digital information, i.e., resumes or curricula vitae or curriculum vitae, to be recorded and distributed, but not edited. Simply put, in a blockchain, all transactions are viewable to all parties within the 'chain', but without the ability to change the integrity of the transaction. This ensures the integrity of the resumes, fully attributes the resumes to the candidates, and also immutably records all of the transactions of the resume; for example, each time the resume is traded as a referral and/or each time a referrer attests to a qualification and/or experience on a candidate's resume. Accordingly, the pre-existing recruiting platforms lack the technology that makes referring accessible (software in cloud), and technology that can digitize 'trust' relationships and delegation of 'trust' along a chain of users.

In view of the above problems associated with pre-existing systems and methods for implementing job searching services, there remains a need to create a crowd-sourced referral platform built on a distributed ledger technology of blockchain cryptography.

SUMMARY

In an exemplary embodiment, a system for creating a referral-based database of resumes of candidates using blockchain smart contracts is provided. The system includes at least one processor, and at least one storage medium for storing instructions for execution by the at least one processor for causing the system to: provide at least one smart contract blockchain profile, the at least one smart contract blockchain profile corresponding to a unique user profile containing qualifications and experiences of at least one candidate, storing the at least one smart contract blockchain profile in a shared ledger of a database, accessing, via user interface, the at least one smart contract blockchain profile via the shared ledger of the database, implementing a scoring match value of the at least one smart contract blockchain profile against a posted qualifications and experiences requirement, implementing a pricing value to gain access to the least one smart contract blockchain profile, and allowing access of the at least one smart contract blockchain profile based on an accepted pricing value.

In another exemplary embodiment, a method for creating a referral-based database of resumes of candidates using blockchain smart contracts is provided. The method includes providing at least one smart contract blockchain profile, the at least one smart contract blockchain profile corresponding to a unique user profile containing qualifications and experiences of at least one candidate, storing the at least one smart contract blockchain profile in a shared ledger of a database, accessing, via user interface, the at least one smart contract blockchain profile via the shared ledger of the database, implementing a scoring match value of the at least one smart contract blockchain profile against a posted qualifications and experiences requirement, implementing a pricing value to gain access to the least one smart contract blockchain profile, and allowing access of the at least one smart contract blockchain profile based on an accepted pricing value.

In yet another exemplary embodiment, a system including at least one processor, and at least one storage medium for storing instructions for execution by the at least one processor for causing the system to: provide at least one posted requirement, the at least one posted requirement corresponding to a unique employer profile containing qualification and experience requirements, store the at least one posted requirement in a shared ledger of a database, provide at least one smart contract blockchain profile, the at least one smart contract blockchain profile corresponding to a unique user profile containing qualifications and experiences of at least one candidate, store the at least one smart contract blockchain profile in a shared ledger of a database, match the at least one smart contract blockchain profile with the at least one posted requirement based on a scoring match value, the scoring match value containing at least one proof of attendance protocol (POAP), calculate a dynamic pricing value based on market conditions, and based on the calculated pricing value, grant access of the at least one smart contract blockchain profile via the shared ledger of the database.

In yet another further exemplary embodiment, a method includes providing at least one posted requirement, the at least one posted requirement corresponding to a unique employer profile containing qualification and experience requirements, storing the at least one posted requirement in a shared ledger of a database, providing at least one smart contract blockchain profile, the at least one smart contract blockchain profile corresponding to a unique user profile containing qualifications and experiences of at least one candidate, storing the at least one smart contract blockchain profile in a shared ledger of a database, matching the at least one smart contract blockchain profile with the at least one posted requirement based on a scoring match value, the scoring match value containing at least one proof of attendance protocol (POAP), calculating a dynamic pricing value based on market conditions, and based on the calculated pricing value, granting access of the at least one smart contract blockchain profile via the shared ledger of the database.

Other features and advantages of the present invention will be apparent from the following more detailed description of the preferred embodiment which illustrates, by way of example, the principles of the invention.

Figure 1:
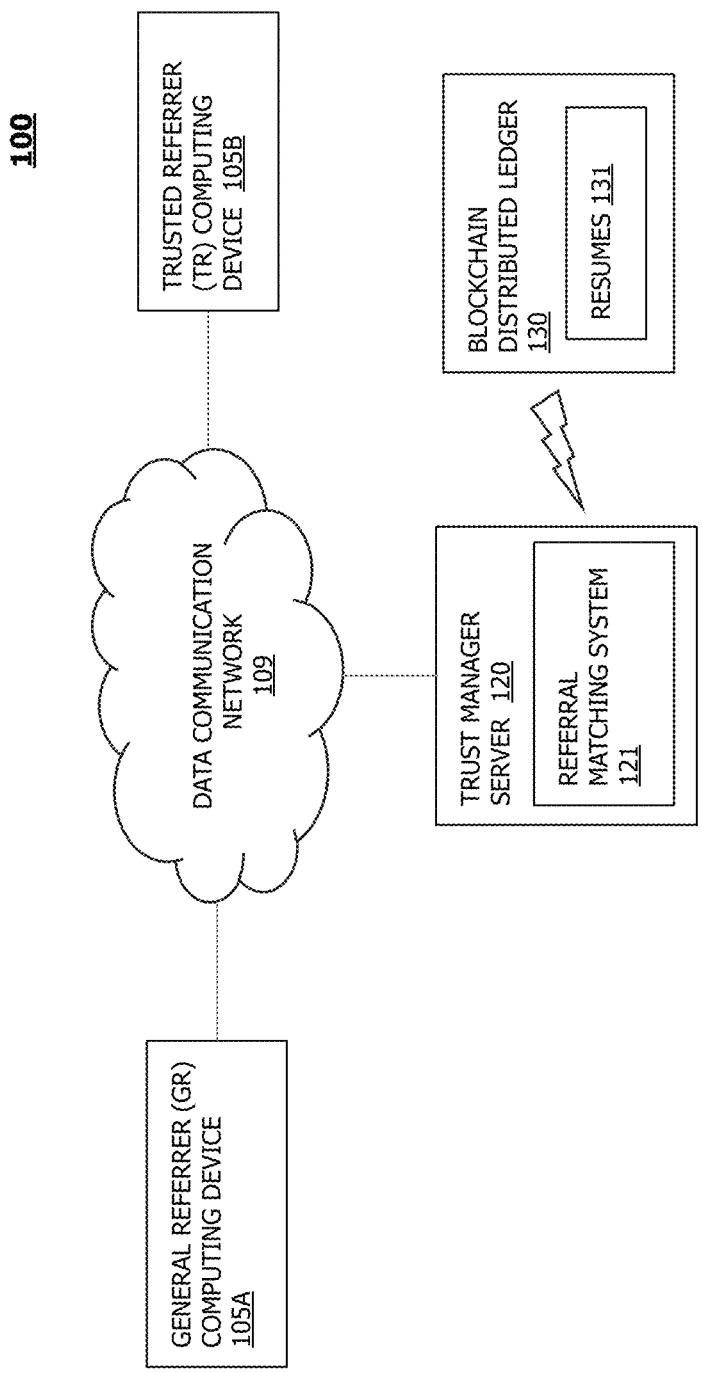
FIG. 1 is a schematic representation of a system for crowd sourcing trusted employment referrals built on a distributed ledger technology of blockchain cryptography, according to an example embodiment of the present disclosure.

It should be noted that these Figures are intended to illustrate the general characteristics of methods, structure and/or components utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative positioning of regions and/or structural elements may be reduced or exaggerated for clarity. The use of similar or identical reference numbers in the various drawings is intended to indicate the presence of a similar or identical element or feature.

DETAILED DESCRIPTION

The present disclosure provides systems and methods for networked or crowd-sourced professionals to refer "trusted" (i.e., personally vetted) candidates to employers. More specifically, the present disclosure provides a referral-based recruiting platform, built on a distributed ledger technology of blockchain cryptography, that financially incentivizes crowd-sourced employment referrals that employers can reliably trust. As such, this shortens the hiring processes and cuts recruitment costs, e.g., candidate vetting, resume review, interviewing, etc., leading to better, qualified candidates.

Further, pre-existing recruiting platforms focus on employers engaging directly with candidates, or employers engage with paid recruiting firms for leads to candidates. Also, there are "head hunters" which are professional employer-retained firms or recruiters that recruit on behalf of a firm, but that has far less volume than crowd sourced referrals as described by the present disclosure. The technology digitizes the trusted relationships between candidate and resume; between qualifications and/or experiences and a candidate's resume; between referrers and candidate qualifications, and/or experiences; and finally between employers and referrers to create an immutable chain of trust that allows the employers to trust crowd-sourced referrals of qualified candidates. In cybersecurity, the security of a system is measured in confidentiality, integrity, availability, and non-repudiation. The blockchain digitizes the trust chain by providing the integrity and non-repudiation-confidentiality is actually replaced with transparency.

Exemplary embodiments provide a dynamic, customized candidate ranking system and position requirements matching for specific job vacancies. Exemplary embodiments can also operate and moderate a virtual marketplace where participants profit by trading qualified and vetted resumes. This leads to an exponentially increased number of trusted referrals and vetted talent acquisitions available to employers. Accordingly, most of the resumes come pre-vetted, where candidate qualifications and experiences have been attested to by a global social network of referrers and immutably and fully attributable resumes.

Some specific features and/or functions include, but not limited to:
- providing a platform for crowd-sources referrals, and/or that facilitates non-human resource (HR), and non-talent acquisition professionals to give referrals for financial compensation;
- providing a candidate search tool that dynamically prioritizes results based on an employer's search criteria, and relationships among referrers;
- applying blockchain cryptography technologies for the purpose of:
- virtually taking ownership of résumés or curricula vitae or curriculum vitae;
- virtually exchanging and tracking résumés;
- providing a virtual community validation/verification of résumé transactions;
- virtually validating/verifying components of résumés;
- virtually tracking validated/verified components of résumé;
- providing a virtual community validation/verification of résumé component transactions;
- virtually representing personal and/or professional relationships;
- virtually tracking personal and/or professional relationships;
- providing a virtual community validation/verification of personal and/or professional relationship transactions;
- virtually tracking hiring needs;
- virtually exchanging, tracking, and accounting for finder's fees or financial rewards/commissions for referrals and talent acquisition; and/or
- providing a virtual community validation/verification of finder's fees or financial rewards/commissions for referrals and talent acquisition transactions.

As described herein, the term "blockchain" refers to a public ledger that records peer-to-peer digital transactions such as Bitcoin transactions.

As described herein, the term "ledger" refers to a principal book or computer file for recording transactions.

As described herein, the term "distributed ledger" is interchangeable with blockchain.

As described herein, the term "smart contracts" refers to digital entities that define complex transaction logic and facilitate cross-organizational workflow including, but not limited to, storage of data, data access permissions, ordered workflow and computation.

As described herein, the terms "device", "terminal", "computer terminal", a "server", interchangeably refer to, but is not limited to hardware such as: a mobile phone, a laptop, a desktop computing, a tablet, a wearable computing device, a cellular communicating device, a PDA, communication device, a personal computer, local and/or remote server or virtual machine residing within an organization or within the cloud, and etc.

As described herein, the term "referrer" refers to a user of the present system. Such examples include, but not limited to, a job seeker, a student, a recruiter, a human resource or talent acquisition specialist, an employee, an employer, a co-worker, a colleague, a friend, etc.

As described herein, the term "candidate" refers to an applicant who is recording their profile online with a goal of finding a job. For example, the applicant could be a student with limited or no work experience, or an experienced hire.

As described herein, the term "profile" refers herein to an electronic record (blockchain smart contract) of a candidate, for example his/her education, qualifications, and work experience, amongst other relevant biographical information, normally recorded and presented in their curriculum vitae, as well as further information particular to a candidate such as government identifiers, work permits, psychometric profiles, health, and financial data. The profile corresponds to a unique user application residing alongside each blockchain node and facilitating a user interface comprising contract data fields presenting the electronic record of the candidate.

As described herein, the term "referrer" refers to general or open referrers that are not associated with an employer company.

As described herein, the term "trusted referrer" refers to referrers that have been identified by the system to recruit on behalf of the employer company, having a higher priority status. This can be enabled by a Trust Token issued by the employer company.

As described herein, the term "entity" refers to any organized body with a particular purpose such as a company, an institution, a university, a government, etc.

As described herein, the term "API" refers to an Application Programming Interface which can be used for applications to communicate with each other.

Accordingly, for the sake of clarity, the present disclosure will refrain from repeating every possible combination of the individual steps in an unnecessary fashion. Nevertheless, the specification and claims should be read with the understanding that such combinations are entirely within the scope of the invention and the claims. As an example, it is understood that "TRUST"—by name—refers to the systems and methods described herein.

Referring now to the drawings, FIG. 1 illustrates a schematic representation of a system 100 for crowd sourcing trusted employment referrals built on a distributed ledger technology of blockchain cryptography, according to an example embodiment of the present disclosure. As shown, the system 100 includes a computing device 105A associated with a general referrer (GR), a computing device 105B associated with a trusted referrer (TR), and a trust manager server 120, each in communication over a data communication network 109 (e.g., Internet or WWW). The data communication network 109 can be a local area or wide area wired or wireless network.

In an exemplary embodiment, the general referrer computing device 105A and the trusted referrer computing device 105B are operated by respective referrers (e.g., job seekers, recruiters, human resource or talent acquisition specialist, employees, employers, co-workers, colleagues, friends, etc.) participating in the system 100. As an example, the general referrer computing device 105A can be operated by a general referrer that is not associated with an employer company and the trusted referrer computing device 105B can be operated by a referrer that has been identified by the system 100 to recruit on behalf of an employer. In this example, the "trusted" referrer has been provided or enabled by a receipt of a trusted token issued by the system 100, which will be described in detail later. It is noted that all referrers or participants implementing this system begins as a "general" referrer and can in time become a "trusted" referrer, or in the alternative, the general referrer can be issued a trusted token and designated directly as a trusted referrer.

In some implementations, the referrer may have a dual role as a general referrer and a trusted referrer. In this case, the activities/functions available to each of the respective referrers will be defined at the time of login, by separate login profiles.

The trust manager server 120 includes a referral matching system 121. According to an example embodiment, the trust manager server 120 generally refers to an application, program, process or device that responds to requests for information or services by another application, program, process or device on a communication network, such as the data communication network 109. According to another example embodiment, the trust manager server 120 also encompasses software that makes an act of serving information or providing services possible.

In conjunction, the trust manager server 120 is beneficially implemented using a block chain arrangement whose operation is coordinated through use of a distributed ledger arrangement 130, wherein the block chain arrangement is hosted in a data communication network including a plurality of data servers and user nodes that, when in operation, exchange data therebetween. In one implementation, the distributed ledger 130 stores a record of the blocks of the blockchain. Data exchange in the block chain arrangement is beneficially implemented in an encrypted manner to protect and validate (authenticate or certify) information of resumes, and to render the block chain arrangement resilient to malicious third-party hackers.

In other words, in its basic explanation, the term 'blockchain' describes the process that allows digital information to be recorded and distributed, but not edited. Simply put, in a blockchain, all transactions are viewable to all parties within the 'chain', but without the ability to change the integrity of the transaction, end to end.

There are various components that make the blockchain package. One example is called a 'smart contract'. A smart contract is an autonomous transaction protocol (i.e., algorithm) that automatically executes, controls, or documents valid events and actions according to the terms of a 'contract' or 'agreement' written into lines of code. The smart contract can assign data within a blockchain to operate on conditions unique to the coded instructions within the smart contract.

Figure 2:
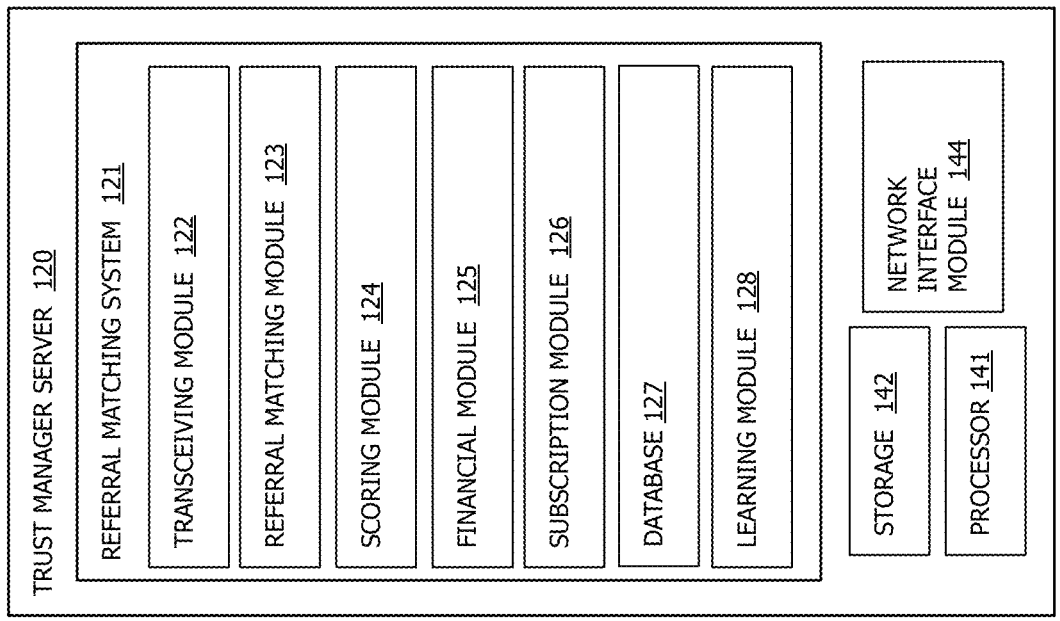
FIG. 2 is a schematic representation of a trust manager server of FIG. 1, according to an example embodiment of the present disclosure.

Referring to FIG. 2, the trust manager server 120 includes a processor 141, a storage 142, and a network interface module 144 for communicating with various databases, files, programs, and networks, and/or one or more storage devices. In one implementation, the trust manager server 120 includes a referral matching system software program that processes requests and responses from the general referrer computing device 105A and/or the trusted referrer computing device 105B. In one implementation, the software program on the trust manager server 120 receives information from the trusted referrer computing device 105B, performs compilation, and storage functions, and sends information to the general referrer computing device 105A. In another implementation, the software program on the trust manager server 120 receives information from the general referrer computing device 105A, performs compilation, and storage functions, and sends information to the trusted referrer computing device 105B. The trust manager server 120 allows the general referrer computing device 105A and/or the trusted referrer computing device 105B to access various network resources. Any number of referrer devices can be connected to the trust manager server 120 and utilize the system remotely at any given time.

The storage 142 includes software including data in database structure to operable execute a referral matching system 121 including at least a transceiving module 122, a referral matching module 123, a scoring module 124, a financial module 124, a subscription module 126, a database 127, and/or a learning module 128. The processor 141 loads and executes software from the transceiving module 122, the referral matching module 123, the scoring module 124, the financial module 124, the subscription module 126, the database 127, and/or the learning module 128, which are software applications stored in the referral matching system 121. The processor 141 can also access data stored in the database in order to carry out the methods and control instructions described herein. Although the trust manager server 120 is shown as a single, unitary system encapsulating one processor 141 and one storage 142, it should be appreciated that one or more storages 142 and one or more processors 141, may comprise the trust manager server 120, which may be a cloud computing application and system. Similarly, while the referral matching system 121 is schematically depicted as a single software application, it is to be recognized that the transceiving module 122, the referral matching module 123, the scoring module 124, the financial module 124, the subscription module 126, the database 127, and/or a learning module 128 may be implemented as various software instruction sets, or modules, stored at various locations, such as on various storage systems. The processor 141 includes a processor, which may be a microprocessor, a general-purpose central processing unit, an application-specific processor, a microcontroller, or any type of logic device. The processor 141 may also include circuitry for retrieving and executing software, including the transceiving module 122, the referral matching module 123, the scoring module 124, the financial module 124, the subscription module 126, the database 127, and/or a learning module 128, from the referral matching system 121. The processor 141 may be implemented with a single processing device, but may also be distributed across multiple processing devices or subsystems that cooperate in executing software instructions.

The transceiving module 122 stored in the referral matching system 121 processes and stores data of information transmitted from the general referrer computing device 105A and/or the trusted referrer computing device 105B. As an example, the transceiving module 122 is operable to receive information, e.g., via the trusted referrer computing device 105B, describing an employer's Qualifications and Experiences (Q&E) requirements for performing a job. Further, the transceiving module 122 is operable to receive information from the referrer, e.g., via the general referrer computing device 105A, regarding a candidate's qualification and experiences. In some implementations, this information is implemented as a blockchain cryptography which turns each resume into a non-fungible token (NFT), which makes each candidate resume immutable and fully attributable to the candidate. To describe differently, the information is implemented as a smart contract blockchain profile corresponding to the candidate's unique qualifications and experiences.

The referral matching module 123 stored in the referral matching system 121 processes and stores data of information associated with a match or comparable information received from the general referrer computing device 105A and the trusted referrer computing device 105B. To describe differently, the referral matching module 123 is operable to analyze the information describing the given candidate's qualifications and experiences in relation to the employer's Qualifications and Experiences (Q&E) requirements. As an example, the referral matching module 123 is operable to assign a first set of values to the information describing the employer's Q&E requirements by applying at least one logic function to the received information thereof. The first set of values may comprise job description, desired education or degree(s), title, pay offered or range of pay, skills desired, minimum years of experience, etc. Further, the referral matching module 123 is also operable to assign a second set of values to the information describing the given candidate's qualifications and experiences by applying at least one logic function to the received information thereof. The second set of values may comprise profile, traits and replies to the Q&E requirements. Such profile and traits include, but not limited to, work and related experiences, education, skills set, objective, awards and honors, activities/hobbies, etc. In some implementations, the referral matching module 123 is further operable to generate a third set of values by applying a cross correlation function to the first set of values and the second set of values. The third set of values can be a match score values between the candidate's qualifications and experiences and the employer's Q&E requirements.

The scoring module 124 is operable to score or rank the given candidate to the employer's Q&E requirements by applying a scoring function. As an example, if the third set of values has a high score, this indicates a matching or comparable candidate in relations to the posted Q&E requirements. In some implementations, the third set of values can be gradually weighted applied on matching Q&E requirements. In some implementations, the scoring module 124 executes a proprietary matching and scoring algorithm that matches, promotes and prioritizes a candidate's qualifications and experiences with the posted Q&E requirements. The scoring module 124 provides these prioritized matches to referrers that have qualified candidates in their respective networks. Further, the scoring logic can match the selected topics in the job requirement against the content in a resume collection. Each matching value is multiplied by a value from the matching requirement and a value from the resume. The total score is an aggregation of the all the score greater than zero generated by the execution of the job requirement. As an example, the content of the job requirement seeks a data scientist having attributes of at least a bachelor's degree (4 years) in mathematics, statistics, or computer science; yet the candidate has only 3 years of mathematics. Since the candidate has less years than the required (or minimum) years of mathematics, the candidate receives a score of zero. In the alternative, if the candidate has a master's (6 years) or doctoral degree (8 years), the candidate then receives a score greater than zero. It should be appreciated that this example is only one attribute score and other attributes may be employed to determine the total score.

The financial module 125 processes and stores data of information associated with financial transactions between the general referrer computing device 105A and the trusted referrer computing device 105B. More specifically, the information can include financial transactions associated with posting an employer's Q&E requirements, referring a qualified candidate(s), or adding a high-quality candidate(s) to the system 100 so as to refer to other referrers. As an example, in operation, the referrer associated with the trusted referrer computing device 105B posts a Q&E requirement to the system and offers to pay X dollars for a candidate with ABC qualifications. Then the referrer associated with the general referrer computing device 105A refers a candidate with some of the qualifications and experiences and offers to refer for Y dollars. If the referrer associated with the trusted referrer computing device 105B wishes to review the resume of the candidate, Y dollars is paid to the referrer associated with the general referrer computing device 105A. Subsequently, the candidate's point-of-contact (POC) information is disclosed for full disclosure and accessibility.

In some implementations, the financial module 125 includes a banking or exchange system software program that processes requests and responses from the general referrer computing device 105A and/or the trusted referrer computing device 105B. In one implementation, the software program on the financial module 125 receives information from devices 105A and/or 105B, performs compilation, and storage functions, and sends financial information to devices 105A and/or 105B. The financial module 125 allows the devices 105A and/or 105B to access various network resources. Any number of devices can be connected to the financial module 125 and utilize the system remotely at any given time.

In other implementations, the financial module 125 includes an escrow feature that holds the "trade price" or finder's fee until the candidate is hired.

The subscription module 126 processes and stores data of information associated with a subscription plan or payment. As an example, an employer may pay for a weekly, monthly, or yearly subscription that allows the employer to delegate referrer(s) to represent the employer's recruitment needs. In one implementation, this can be done when the employer awards a trust token to a referrer, which will be described later in detail. The subscription module 126, in conjunction with the financial module 125, is operable to process any financial transactions, such as administering the designated subscription plan and/or payment to a referrer (i.e., trusted referrer).

The database 127 is operable to store the information describing the given candidate. Further, the database 127 is operable to store the information received from the referrer. Furthermore, the database 127 may be a single or multiple modules or devices including hardware, software, firmware, or a combination thereof.

The learning module 128 is operable to manage the communications and data flows to and from the referral matching system 121, processes recommendations of the Q&E requirements provided by employer and the referrers. The learning module 128 is further operable to apply the learning function to the recommendation information. The learning module 128 is then operable to update the cross correlation function, the scoring function as well as the profiles.

The network interfacing module 144 may enable the trust manager server 120 to establish connection with the data communication network 109 or/and with other network devices such as the computing devices 105A and 105B.

Figure 3:
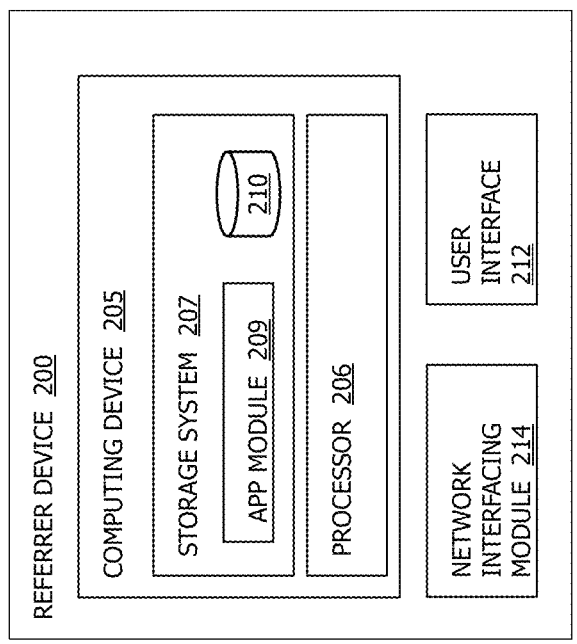
FIG. 3 a schematic representation of a referrer device of FIG. 1, according to an example embodiment of the present disclosure.

Referring now to FIG. 3, the referrer device 200 is a device (e.g., a mobile device, a smartphone, a tablet, a desktop computer, a portable computer) possessed by the referrer who intends to post an employer's Q&E requirements, refer a qualified candidate(s), or add a high-quality candidate(s) to the system 100. As shown, the referrer device 200 includes at least a computing system 205 having a processor 206 and a storage system 207, a user interface 212, and a network interface module 214 for communicating with the trust manager server 120.

The storage system 207 includes software, including an app module 209 and stored data 210, including data in database structure. The processor 206 loads and executes software, including the app module 209, which are software applications stored in the storage system 207. The processor 206 can also access data stored in the database 210 in order to carry out the methods and control instructions described herein. Although the computing system 205 is shown as a single, unitary system encapsulating one processor 206 and one storage system 207, it should be appreciated that one or more storage systems 207 and one or more processors 206, may comprise the computing system 205, which may be a cloud computing application and system. Similarly, while the app module 209 is schematically depicted as a single software application contained on a single storage system 207, it is to be recognized that the app module 209 may be implemented as various software instruction sets, or modules, stored at various locations, such as on various storage systems. The processor 206 includes a processor, which may be a microprocessor, a general-purpose central processing unit, an application-specific processor, a microcontroller, or any type of logic device. The processor 206 may also include circuitry for retrieving and executing software, including the app module 209, from the storage system 207. The processor 206 may be implemented with a single processing device, but may also be distributed across multiple processing devices or subsystems that cooperate in executing software instructions.

In some implementations, the network interface module 214 is an interface for communicating by any wireless communication protocols or means, such as Bluetooth, Wi-Fi, RF transmission, GPS, ZigBee, Z-Wave, or the like. The network interface module 214 can also be an interface for communication with the trust manager server 120 via the data communication network 109.

In some implementations, the user interface 212 can be hardware, for example, a keyboard or a touch panel display for receiving information from the user. In some implementations, the user interface 212 can be hardware, for example, a display for displaying and outputting various information relating to, but not limited to, financial information associated with the financial or exchange system, as discussed herein.

Figure 4A:
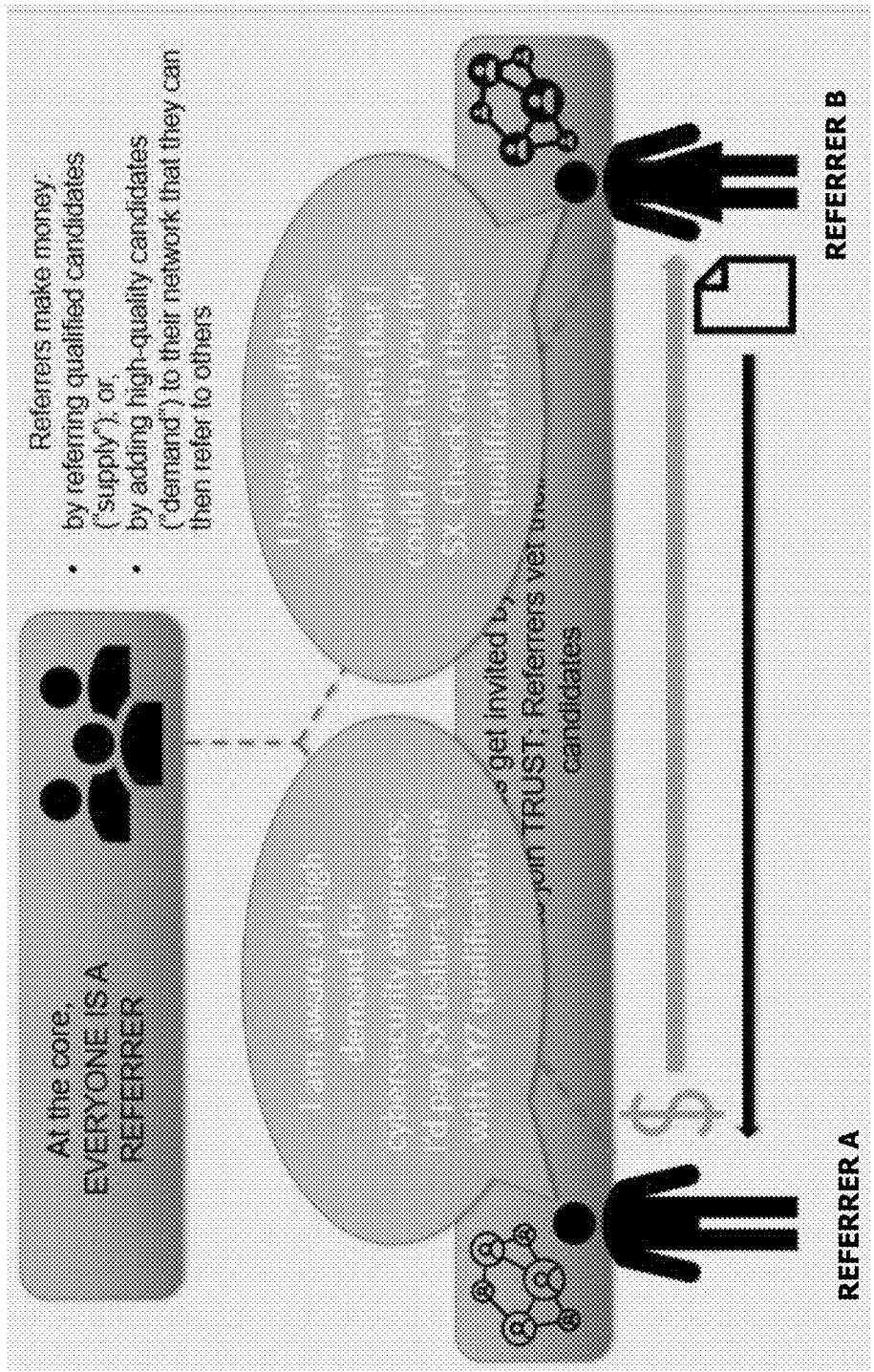
FIGS. 4A and 4B are graphical illustrations of exemplary methods between referrers, according to an example embodiment of the present disclosure.
Figure 4B:
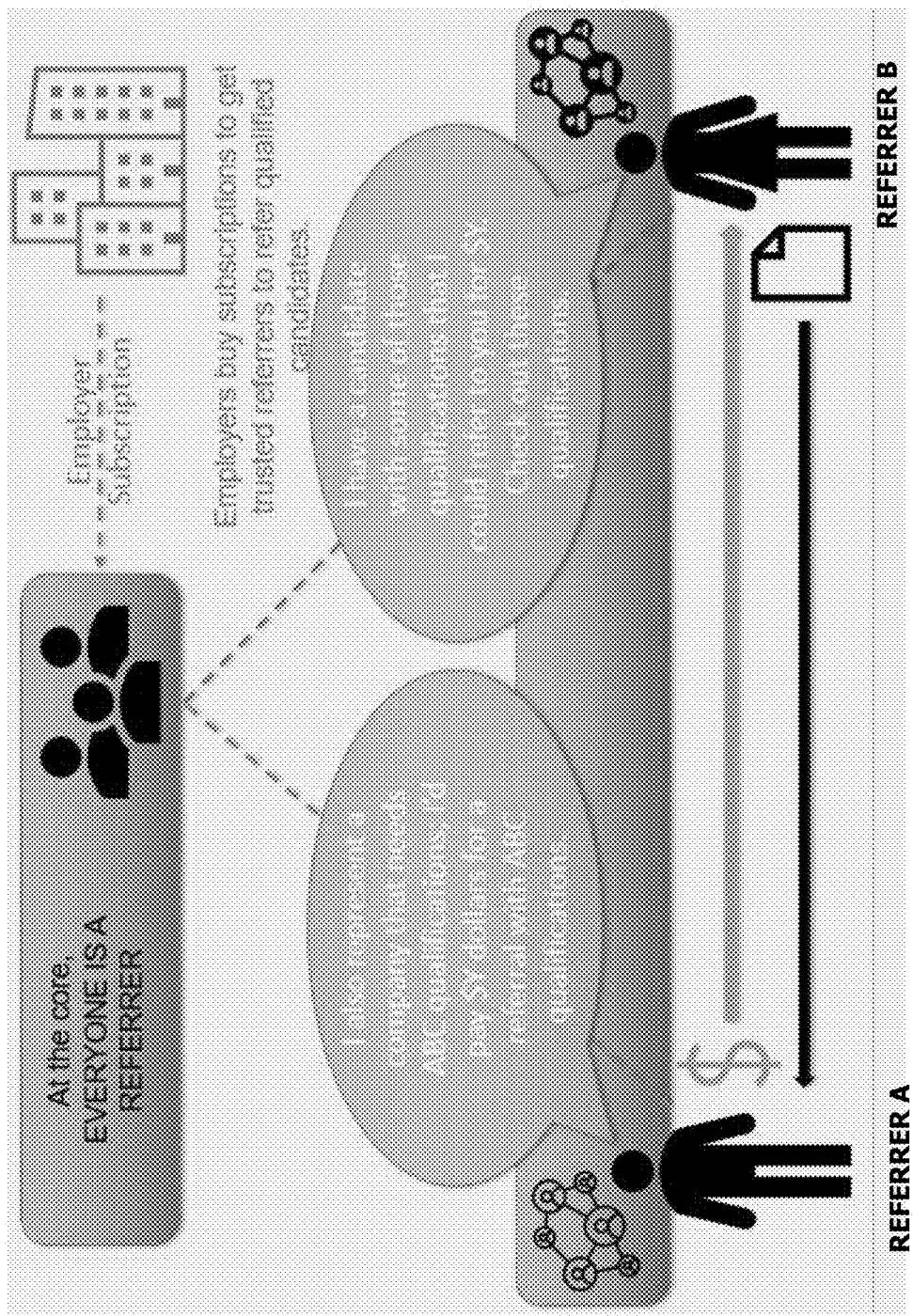

FIGS. 4A and 4B are graphical illustrations of exemplary methods between referrers, according to an example embodiment of the present disclosure. FIG. 4A illustrates a transaction between two referrers. In this case, referrer A is a "general" referrer where referrer A knows of a vacant position of a company and referrer B is also an "general" referrer where a candidate's resume is referred into the system 100 and in referrer's B referral network. As illustrated, referrer A knows of a posted Q&E requirements in system 100 and offers to pay X dollars for a candidate with XYZ qualifications. Then referrer B refers a candidate with some of the qualifications and experiences and offers to provide candidate's profile for Y dollars. If referrer A wishes to review the resume of the candidate and accepts referrer B's offer, Y dollars is paid to referrer B. At this time, the candidate's point-of-contact (POC) information is disclosed to referrer A for review and possible contact with the candidate. It is noted here that the goal of the present system 100 is to get candidates hired through referrals, hence every candidate should to be in as many referral networks as possible. Additionally, as a candidate belongs to more referral networks, this provides a greater resume vetting of the candidate via blockchain cryptography and a proof of attendance protocol (POAP). A POAP is a protocol that creates digital badges or collectibles through the use of blockchain technology. The present system 100 enables distributed ledgering of all resume vetting, meaning that all of the vetting provided by referrers are immutably recorded with each resume and traceable to the providing referrer.

Referring now to FIG. 4B, this scenario illustrates a similar transaction between two referrers. In this case, referrer A is a "trusted" referrer that represents a company and referrer B is a "general" referrer where a candidate's resume is referred into the system 100 and in referrer's B referral network. Further, as shown, the company has a paid subscription in systems 100 that allows the company to delegate referrer(s) to represent that company's recruitment needs. This can be done when the company awards a Trust Token to referrer A. In some occasions, these trusted referrers can even be members of the company's existing staff or an external recruiting firm. The referrers that receive these tokens are specifically entrusted to recruit on behalf of the company. It is noted that these referrers are the source of the most trustworthy referrals in the present system 100. As illustrated, referrer A posts the Q&E requirements into the system 100 and offers to pay Y dollars for a candidate with ABC qualifications. Then referrer B refers a candidate with some of the qualifications and experiences and offers to provide candidate's profile for Y dollars. If referrer A wishes to review the resume of the candidate and accepts referrer B's offer, Y dollars is paid to referrer B. At this time, the candidate's point-of-contact (POC) information is disclosed to referrer A for review and possible contact with the candidate.

Figure 5:
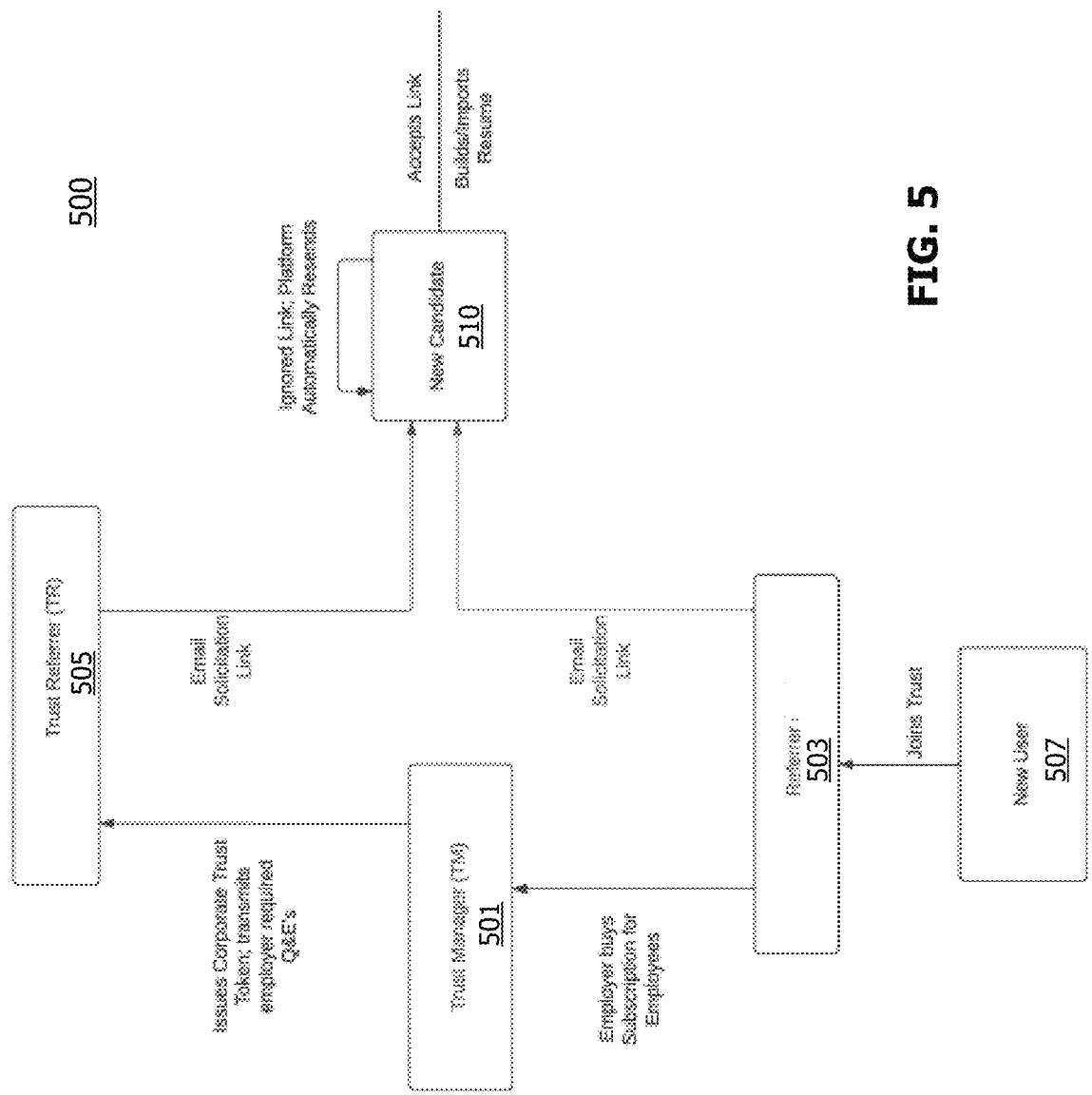
FIG. 5 is a flowchart illustrating an exemplary method, according to an example embodiment of the present disclosure.

FIG. 5 is a flowchart illustrating an exemplary method of participating in the present system, according to an example embodiment of the present disclosure. As illustrated, system 500 includes a Trust Manager (TM) 501 (corresponding to a Trust Manager Server 120 of FIG. 1) in interaction with an general referrer (GR) 503 and/or a trusted referrer (TR) 505. In some implementations, the trusted referrer 505 for any given company can be called that company's "Circle of Trust." During initial set-up, in order to initiate and execute system 500, a new user 507 joins as a general referrer 503.

In this example, the employer wishes the general referrer 503 to recruit on behalf of the employer. Accordingly, the employer buys a subscription for the general referrer 503 and the system 500 issues a corporate trust token such that the general referrer 503 is now designated as a trusted referrer 505. At that time, the system 500 receives an employer's Q&E requirements and posts or transmits the Q&E requirements in system 500 for dissemination to all of trusted referrer's 505 (and/or the general referrer's 503) network. In addition to the Q&E requirements, the trusted referrer 505 can also post any potential "referral fees" for referring the candidate. If a candidate's qualifications and experiences is a match or close match received from another referrer and the trusted referrer 505 wish to see the resume, the system 500 executes a financial transaction to exchange a fee for receiving a full point-of-contact (POC) information. In one implementation, an email solicitation link can be sent to a candidate 510 by the trusted referrer 505 for the available position. Other implementations can be employed such as direct communication via telephone received from the POC information.

Figure 6:
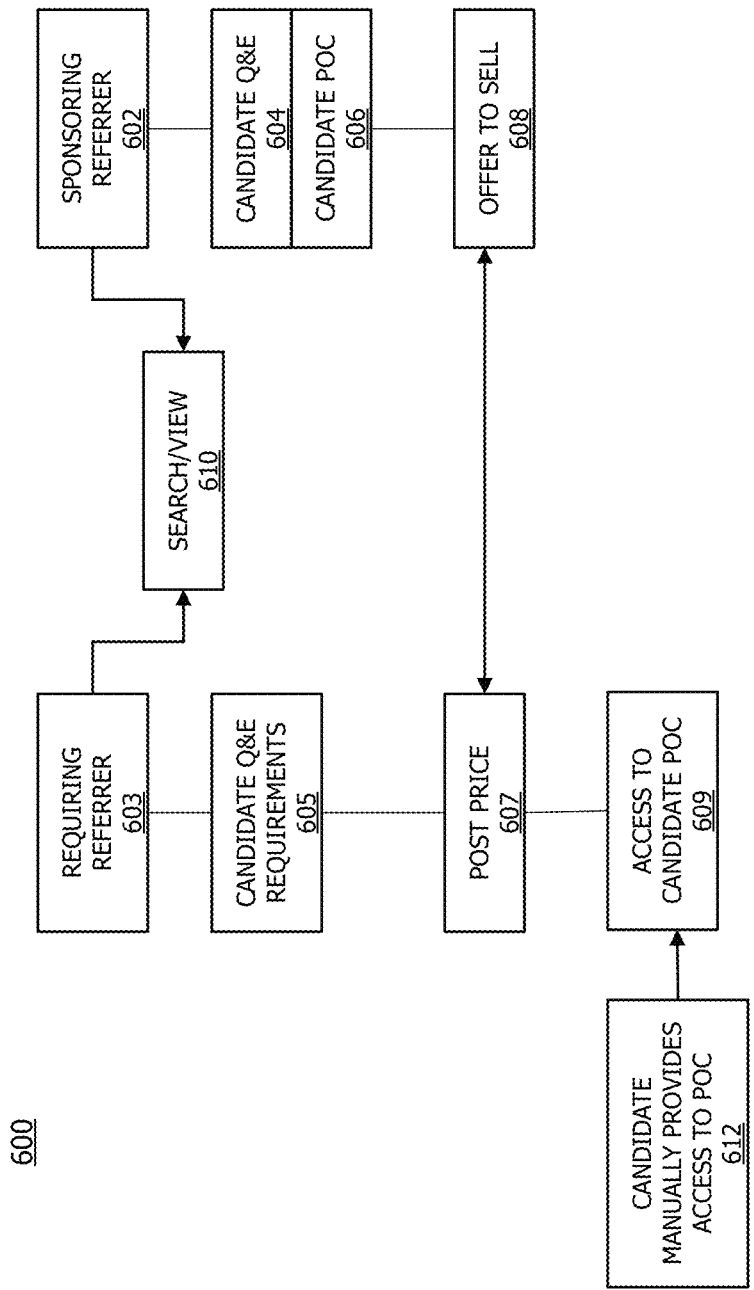
FIG. 6 is a flowchart illustrating an exemplary method, according to an example embodiment of the present disclosure.

FIG. 6 is a flowchart illustrating an exemplary method and system, according to an example embodiment of the present disclosure. As shown, system 600 illustrates a transaction between a "requiring referrer" and a "sponsoring referrer." These terms are merely nomenclature and not limited by any means. In one implementation, a requiring referrer can be a referrer that is looking for a candidate while a sponsoring referrer can be a referrer that has a candidate in their respective network. Starting from block 603, the requiring referrer posts a Q&E requirements (block 605) and a price, e.g., referral fee or set amount for willingness to pay (block 605) in system 600. As an example, if the requiring referral is a "general" referrer, the requiring referral can post information associated with a "high demand" Q&E requirements. Alternatively, if the requiring referral is a "trusted" referrer, the requiring referral can post information associated with corporate employer's vacancy Q&E requirements. Referring now to block 602, the sponsoring referrer sponsors a candidate in their respective network. That is, the sponsoring referrer has possession of the candidate's resume containing qualifications and experiences (block 604) and a point-of-contact (POC) (block 606). At this time, each of the requiring referrer and the sponsoring referrer can search and view all candidate's qualifications and experiences for opportunities to trade (buy or sell) access to a matched candidate (i.e., candidates with the most matched Q&E requirements) (block 610). Further, the system 600 can provide each referrer with a score matching value of a candidate's qualifications and experiences against the company's Q&E requirements. In some implementations, the score matching value can be performed with a graduated weighting method and/or from a number of POAPs associated with the candidate). If the sponsoring referrer decides to offer the candidate's POC information to the requiring referrer for the posted willingness to pay, then the requiring referrer has access to the candidate's POC information to contact the candidate directly (block 609) That is, if the requiring referrer decides to buy access to the matched candidate's qualifications and experiences, the requiring referrer pays the sponsoring referrer the originally posted willingness to pay price in exchange for the matched candidate's POC information. In some implementations, the sponsoring referral can delegate access to the matched candidate's POC information to the recruiting referrer. Alternatively, in some instances, the candidate can manually provide access to the POC information to the recruiting referrer and/or the sponsoring referrer (block 612). This enables that the candidate can be included in as many referrer's network as possible. In sum, system 600 provides various and numerous referrers including employers with access to the candidate's qualifications and experiences and POC information.

In other implementations, the sequence of events is that the requiring referrer posts requirements including a posting willingness to pay price. Then the system scans all known matching candidate's qualifications/experiences and notifies requiring referrer and sponsoring referrers of any matches. Then, at that time, the sponsoring referrer decide whether to offer to sell matching candidate POCs at posted willingness to pay price. Sponsoring referrer offers to sell at posted price and the requiring referrer transmits the agreed set price. Finally, the sponsoring referrer provides the candidate's POC information, which allows the requiring referrer to have the candidate in their network of candidates.

Figure 7:
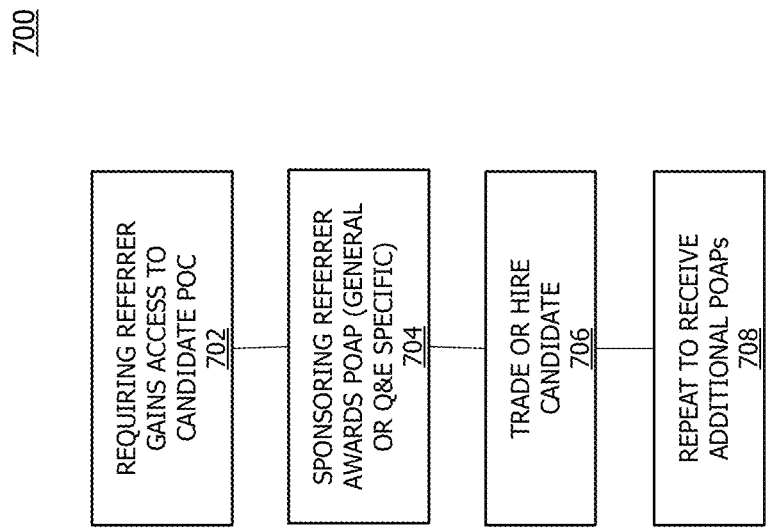
FIG. 7 is a flowchart illustrating an exemplary method, according to another example embodiment of the present disclosure.

Now to the discussion of data exchange in blockchain arrangement. FIG. 7 illustrates a flowchart illustrating an exemplary method of a blockchain arrangement whose operation is coordinated through use of a distributed ledger arrangement, according to an example embodiment of the present disclosure. In operation, there are several methods to validate or vet the information on the candidate's resume through blockchain-based ledger. One method is that the requiring referrer gains access to the candidate's POC information (block 702). This in essence applies a POAP to the candidate's resume for validation/vetting of qualifications and experiences. As aforementioned, a POAP is a protocol that creates digital badges or collectibles through the use of blockchain technology. In this case, the POAPs can be a token associated with the qualifications and experiences of the candidate. For example, a non-fungible token, or NFT can be issued as a POAP. Accordingly, the resume is immutable and fully attributable to that candidate only. Additionally, and alternatively, the sponsoring referrer can award a POAP (block 704), which can be associated as a general ledger or qualifications and experiences specific, which in turn, is the sponsoring referrer's attestation/validation/vetting of the Q&E requirements or of the resume as a whole. In some instances, this can be the candidate's first POAP. That said, POAP should be applied every time a candidate joins the platform and/or gets a new sponsoring referrer. As a purpose herein, the method is to attest or validate the resume, the candidate's intent is to mint as many POAPs as possible. As a result, more POAPs translate to having a greater validated/vetted resume. In some instances, the greater the POAPs, the candidate is traded or hired by the employer (block 706). This process of awarding POAPs should be repeated as many times as possible so that the candidate can receive more POAPs (block 708).

In some implementations, the candidate can manually give access to any referrer (and be part of the respective network) at no cost to the referrer to gain more POAPs on their own resume. In some implementations, the referrers can then turn around and sell access to the POC information of the candidate. This ensures that the candidate's resume is in a vast array of referrers' network and increases the referrer-based market penetration.

For background sake, the blockchain-based ledger can include several blocks. Each block can include a previous hash, a transaction root, a timestamp, and a nonce. The previous hash can be the value obtained by hashing a previous block in the blockchain-based ledger. For example, if a block is the Nth block in the blockchain-based ledger, then the previous hash is the value of the hash of block N−1. The transaction root is the root hash value of a hash tree (e.g., a Merkle tree) over all transactions to be added to the block. For example, transactions may be any type of transaction, and may include any type of data associated with qualifications and experiences of the candidate. In order to add transactions to the blockchain-based ledger, each transaction is hashed to obtain hashed transactions. The hashed transactions are then hashed with each other to obtain hashes. It will be appreciated that all transaction roots of all blocks in the blockchain-based ledger include a corresponding similar hash tree. As a result, each block added to the blockchain-based ledger is a confirmation of all the transactions that occurred before, making the blockchain-based ledger effectively permanent and immutable. This is because it would be computationally impractical/impossible to modify the blocks of the blockchain-based ledger by any bad actors.

Figure 8:
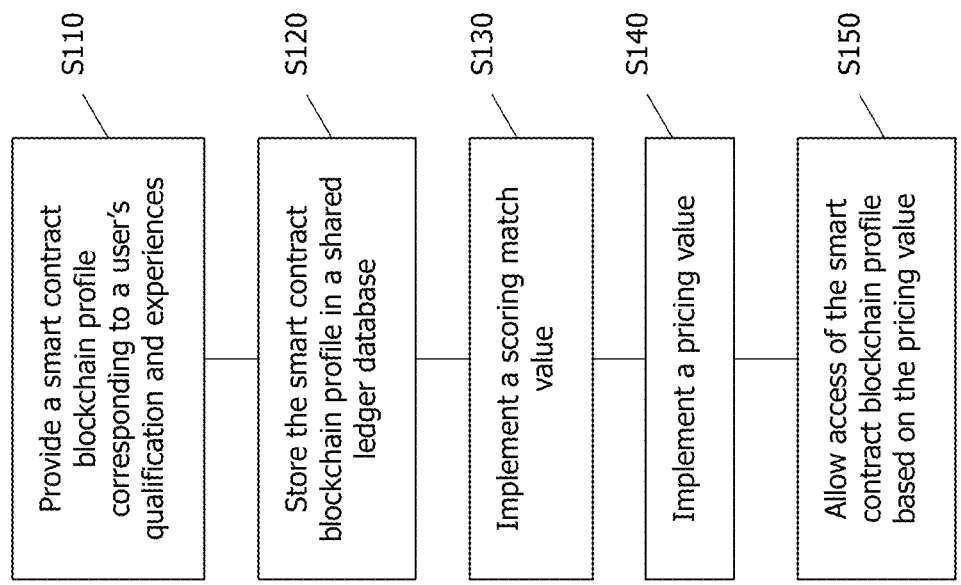
FIG. 8 is a flowchart illustrating an exemplary method, according to an example embodiment of the present disclosure.

FIG. 8 is a flowchart of a method of creating a referral-based database of resumes of candidates using blockchain smart contracts, according to an example embodiment. These steps may be executed, for example, by the referral matching system 121, which may be on the trust manager server 120. In step S110, the referral matching system 121 operable receives a smart contract blockchain profile corresponding to a candidate's qualifications and experiences. In step S120, the smart contract blockchain profile is stored in a shared ledger database. This provides the resume to be vetted through blockchain cryptography, which turns each resume into a non-fungible token (NFT) and makes each resume immutable and fully attributable to the candidate. Next, in step S130, the referral matching system 121 operable implements a matching score value in comparison to a Q&E requirements posted by a referrer (GR or TR referrer). The referral matching system 121 executes the matching and scoring algorithm that matches and prioritizes the candidate's qualifications and experiences with the posted qualification requirements. The referral matching system 121 provides these prioritized matches to referrers that have qualified candidates in their respective networks. Then, in step S140, the referral matching system 121 operable implements a pricing value or pricing platform. As an example, if the first referrer accepts the offered candidate, the first referrer pays the agreed amount and in exchange for payment, the second referrer provides the full contact information of the candidate. At step S150, once the referrer accepts the offer, the referrer has access to the point-of-contact (POC) information and is able to review and contact the candidate directly.

Figure 9:
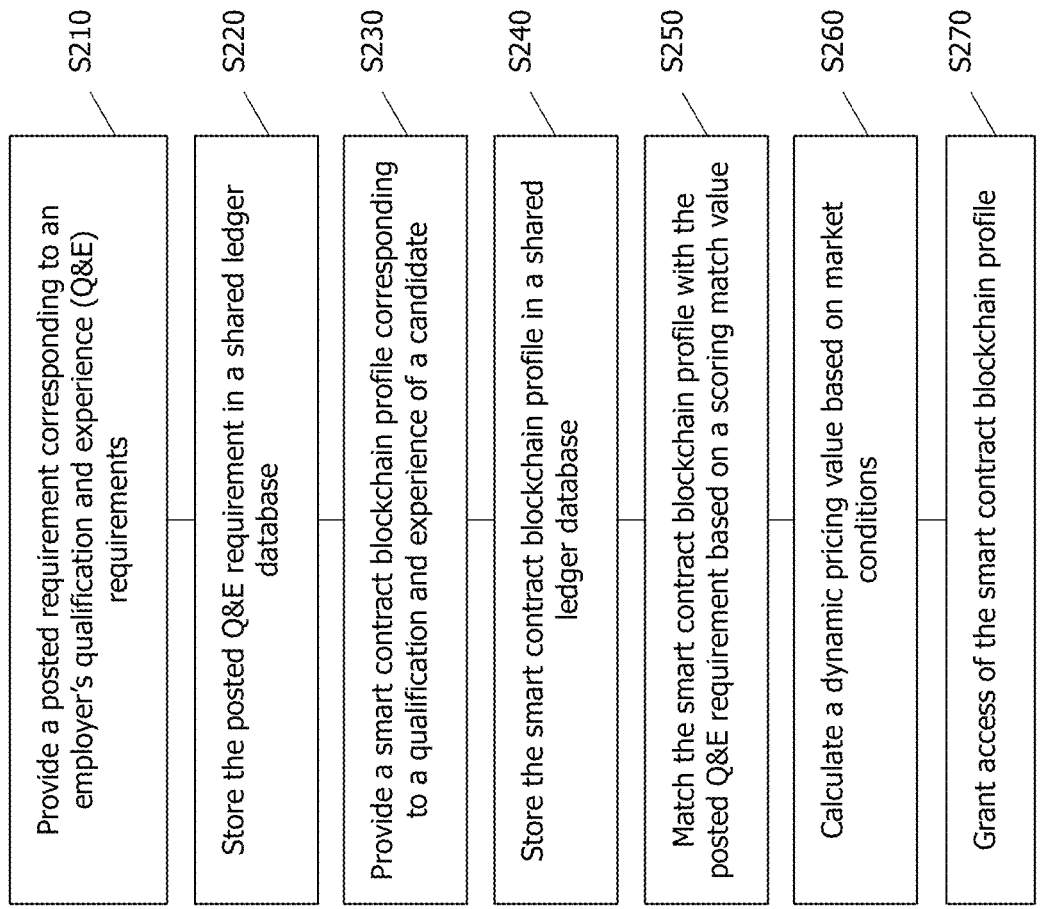
FIG. 9 is a flowchart illustrating an exemplary method, according to an example embodiment of the present disclosure.

FIG. 9 is a flowchart of a method of creating a referral-based database of resumes of candidates using blockchain smart contracts, according to another example embodiment. These steps may be executed, for example, by the referral matching system 121, which may be on the trust manager server 120. It is noted that this method is similar to FIG. 8 except for an employer delegates a trust token to a referrer, designating as a "trusted" referrer. In step S210, the referral matching system 121 operable receives an employer's Q&E requirements posted by an employer via a subscription and issues a trust token to a trusted referrer. Then, in step S220, the posted Q&E is stored in a shared ledger database. Then, in step S230, the referral matching system 121 operable receives, from another referrer, a smart contract blockchain profile corresponding to a candidate's qualifications and experiences. Similarly, in step S240, the smart contract blockchain profile is stored in a shared ledger database. Again, this provides the resume to be vetted through blockchain cryptography, which turns each resume into a non-fungible token (NFT) and makes each resume immutable and fully attributable to the candidate. Next, in step S250, the referral matching system 121 operable implements a matching score value in compared to a Q&E requirements posted by the referrer (GR or TR referrer). The referral matching system 121 executes the matching and scoring algorithm that matches and prioritizes candidate qualifications and experiences with the posted qualification requirements. The referral matching system 121 provides these prioritized matches to referrers that have qualified candidates in their respective networks. Then, in step S260, the referral matching system 121 operable implements a pricing value or pricing platform. As an example, if the first referrer accepts the offered candidate, the first referrer pays the agreed amount and in exchange for payment, the second referrer provides the full contact information of the candidate. At step S270, once the first referrer accepts the offer, the first referrer has access to the point-of-contact (POC) information and is able to review and contact the candidate directly.

Figure 10:
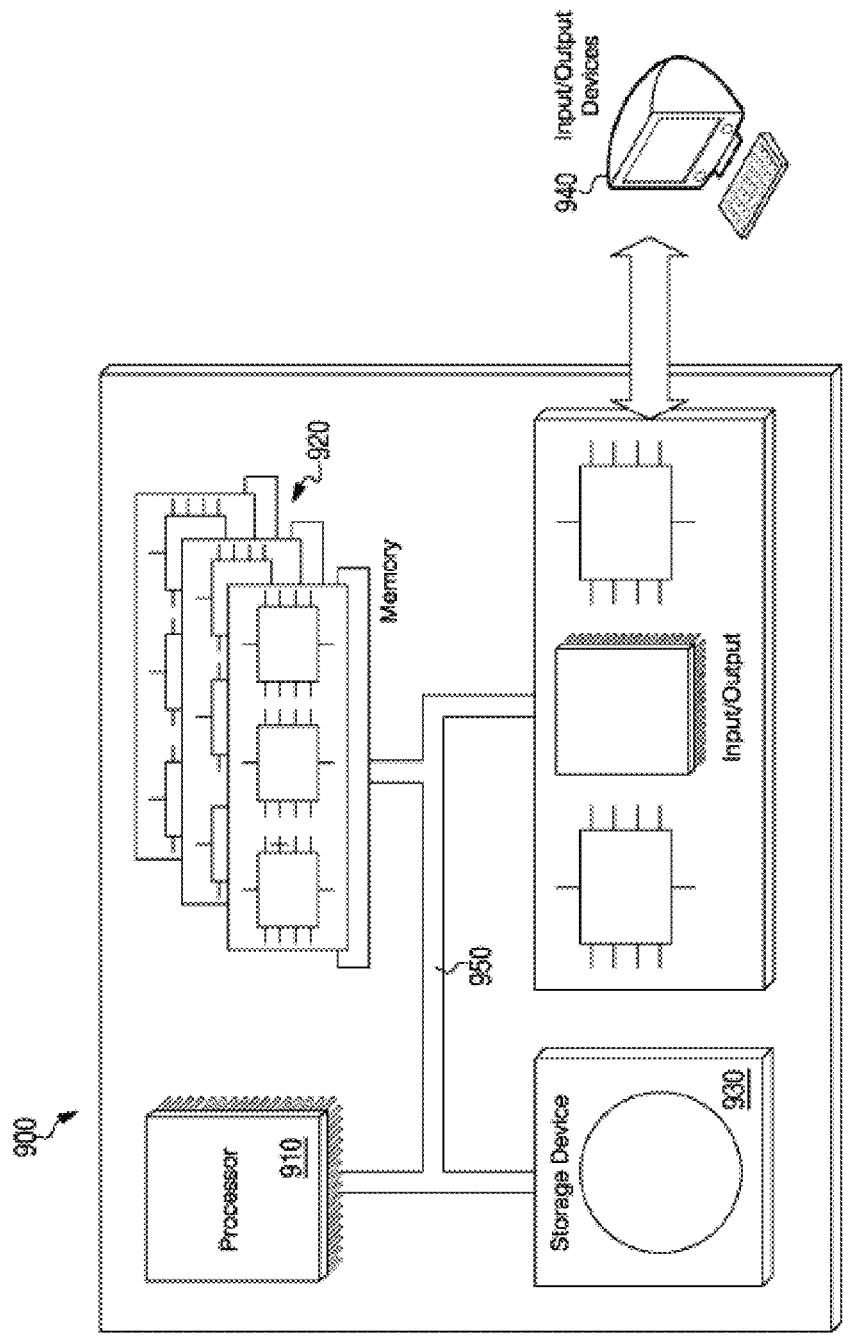
FIG. 10 is a schematic diagram of a computer system, according to an example embodiment of the present disclosure.

FIG. 10 is a schematic diagram of a computer system 900. The system 900 can be used to carry out the operations described in association with any of the computer-implemented methods described previously, according to some implementations. For example, storage device 930 of system 900 can store instructions that are executable by one or more processing devices 910 to perform operations of the referral system 121 including, but not limited to, the transceiving module 122, the referral matching module 123, the scoring module 124, the financial module 125, the subscription module 126, the database 127, or the learning module 128.

In some implementations, computing systems and devices and the functional operations described in this specification can be implemented in digital electronic circuitry, in tangibly-embodied computer software or firmware, in computer hardware, including the structures disclosed in this specification (e.g., system 900) and their structural equivalents, or in combinations of one or more of them. The system 900 is intended to include various forms of digital computers, such as laptops, desktops, workstations, personal digital assistants, servers, blade servers, mainframes, and other appropriate computers, including vehicles installed on base units or pod units of modular vehicles. The system 900 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 900 includes a processing device or processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In some implementations, storage device 930 is a hardware-based storage device. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The machine learning model can run on Graphic Processing Units (GPUs) or custom machine learning inference accelerator hardware.

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet. The computer system can include clients and servers. A client and server are generally remote from each other and typically interact through a network, such as the described one. The relationship of client and server arises by virtue of computer programs running on the respective computers and having a client-server relationship to each other.

In some implementations, the present disclosure provides a business model that can be organized regionally. In other words, the business model tailors a specific marketing communication strategy that meets regional needs and brand recognition as well as being able to offer users a good service with sufficient user proximity. In addition, when scaling up the business model, it offers the opportunity to trial and test quicker to finetune the business model.

Further, the present systems and methods as described herein can be implemented for employers who may not want to make themselves known, such as an entity like the National Security Agency (NSA) or other government agencies or a contracting firm performing clandestine operations-essentially any entity that requires anonymity for supply chain risk management. As such, employers can anonymously find qualified candidates through the "trusted" referrers.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms "first," "second," etc. may be used herein to describe various elements, these elements should not be limited by these terms. These terms do not denote any order, quantity or importance but rather only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A system for creating a referral-based database of resumes of candidates using blockchain smart contracts, comprising:
   at least one processor; and
   at least one storage medium for storing instructions for execution by the at least one processor for causing the system to:
   receive and execute a trust token from a user computing device, at least one posted requirement, the at least one posted requirement corresponding to a unique employer profile containing qualification and experience requirements;
   store the at least one posted requirement in a shared ledger of a database;
   provide at least one smart contract blockchain profile, the at least one smart contract blockchain profile corresponding to a unique user profile containing qualifications and experiences of at least one candidate;
   store the at least one smart contract blockchain profile in a shared ledger of a database;
   match the at least one smart contract blockchain profile with the at least one posted requirement by calculating a scoring match value, wherein the calculating scoring match value comprises: (i) quantifying a plurality of proof of attendance protocol (POAP) associated with smart contract blockchain profile of the candidate; and (ii) processing the quantified plurality of POAPs against the at least one posted qualification and experience requirements;

calculate a dynamic pricing value based on the calculated scoring match value and market conditions for the at least one posted qualification and experience requirements; and provide, via the smart contract representing the trust token, a transfer of a referral fee, and based on the calculated dynamic pricing value, granting access of the at least one smart contract blockchain profile via the shared ledger of the database.

2. The system of claim 1, wherein the at least one storage medium for storing instructions for execution by the at least one processor further causes the system to:

assign a first set of values associated with the employer qualifications and experiences requirements by applying at least one logic function;

assign a second set of values associated with qualifications and experiences of the at least one candidate by applying at least one logic function; and generate a third set of values by applying a cross correlation function to the first set of values and the second set of values.

3. The system of claim 1, wherein the employer qualifications and experiences requirements include at least one of: job description, desired education or degree(s), title, pay offered or range of pay, skills desired, and minimum years of experience.

4. The system of claim 1, wherein the qualifications and experiences of the at least one candidate include at least one of: work and related experiences, education, skills set, objective, awards and honors, or activities/hobbies.

5. The system of claim 1, wherein the at least one storage medium for storing instructions for execution by the at least one processor for further causes the system to issue at least one of the plurality of proof of attendance protocol (POAP) to attest contents of the at least one smart contract blockchain profile.

6. The system of claim 5, wherein issuance of the plurality of proof of attendance protocols indicates a higher attestation or validation of the at least one smart contract blockchain profile.

7. The system of claim 1, wherein the at least one storage medium for storing instructions for execution by the at least one processor for further causes the system to issue at least one trust token to gain access to the posted qualifications and experiences requirement.

8. A method, comprising:

receive and execute a trust token from a user computing device, at least one posted requirement, the at least one posted requirement corresponding to a unique employer profile containing qualification and experience requirements;

storing the at least one posted requirement in a shared ledger of a database;

providing at least one smart contract blockchain profile, the at least one smart contract blockchain profile corresponding to a unique user profile containing qualifications and experiences of at least one candidate;

storing the at least one smart contract blockchain profile in a shared ledger of a database;

matching the at least one smart contract blockchain profile with the at least one posted requirement by calculating a scoring match value, wherein the calculating scoring match value comprises: (i) quantifying a plurality of proof of attendance protocol (POAP) associated with smart contract blockchain profile of the candidate; and (ii) processing the quantified plurality of POAPs against the at least one posted qualification and experience requirements;

calculating a dynamic pricing value based on the calculated scoring match value and market conditions for the at least one posted qualification and experience requirements; and providing, via the smart contract representing the trust token, a transfer of a referral fee, and based on the calculated dynamic pricing value, granting access of the at least one smart contract blockchain profile via the shared ledger of the database.

9. The method of claim 8, further comprising:

assigning a first set of values associated with the employer qualifications and experiences requirements by applying at least one logic function;

assigning a second set of values associated with qualifications and experiences of the at least one candidate by applying at least one logic function; and generating a third set of values by applying a cross correlation function to the first set of values and the second set of values.

10. The method of claim 8, wherein the employer qualifications and experiences requirements include at least one of: job description, desired education or degree(s), title, pay offered or range of pay, skills desired, and minimum years of experience.

11. The method of claim 8, wherein the qualifications and experiences of the at least one candidate include at least one of: work and related experiences, education, skills set, objective, awards and honors, or activities/hobbies.

12. The method of claim 8, further comprising issuing at least one of the plurality of proof of attendance protocol (POAP) to attest contents of the at least one smart contract blockchain profile.

13. The method of claim 12, wherein issuance of the plurality of proof of attendance protocols indicates a higher attestation or validation of the at least one smart contract blockchain profile.

14. The method of claim 8, further comprising issuing at least one trust token to gain access to the posted qualifications and experiences requirement.

15. A non-transitory computer-readable medium storing software comprising instructions executable by one or more computers which, upon such execution, cause the one or more computers to perform operations, comprising:

receive and execute a trust token from a user computing device, at least one posted requirement, the at least one posted requirement corresponding to a unique employer profile containing qualification and experience requirements;

store the at least one posted requirement in a shared ledger of a database;

provide at least one smart contract blockchain profile, the at least one smart contract blockchain profile corresponding to a unique user profile containing qualifications and experiences of at least one candidate;

store the at least one smart contract blockchain profile in a shared ledger of a database;

match the at least one smart contract blockchain profile with the at least one posted requirement by calculating a scoring match value, wherein the calculating scoring match value comprises: (i) quantifying a plurality of proof of attendance protocol (POAP) associated with smart contract blockchain profile of the candidate; and (ii) processing the quantified plurality of POAPs against the at least one posted qualification and experience requirements;

calculate a dynamic pricing value based on the calculated scoring match value and market conditions for the at least one posted qualification and experience requirements; and provide, via the smart contract representing the trust token, a transfer of a referral fee, and based on the calculated dynamic pricing value, granting access of the at least one smart contract blockchain profile via the shared ledger of the database.

* * * * *